(No Model.)
N. CURTIS.
PRESSURE REGULATOR.
No. 246,088. Patented Aug. 23, 1881.
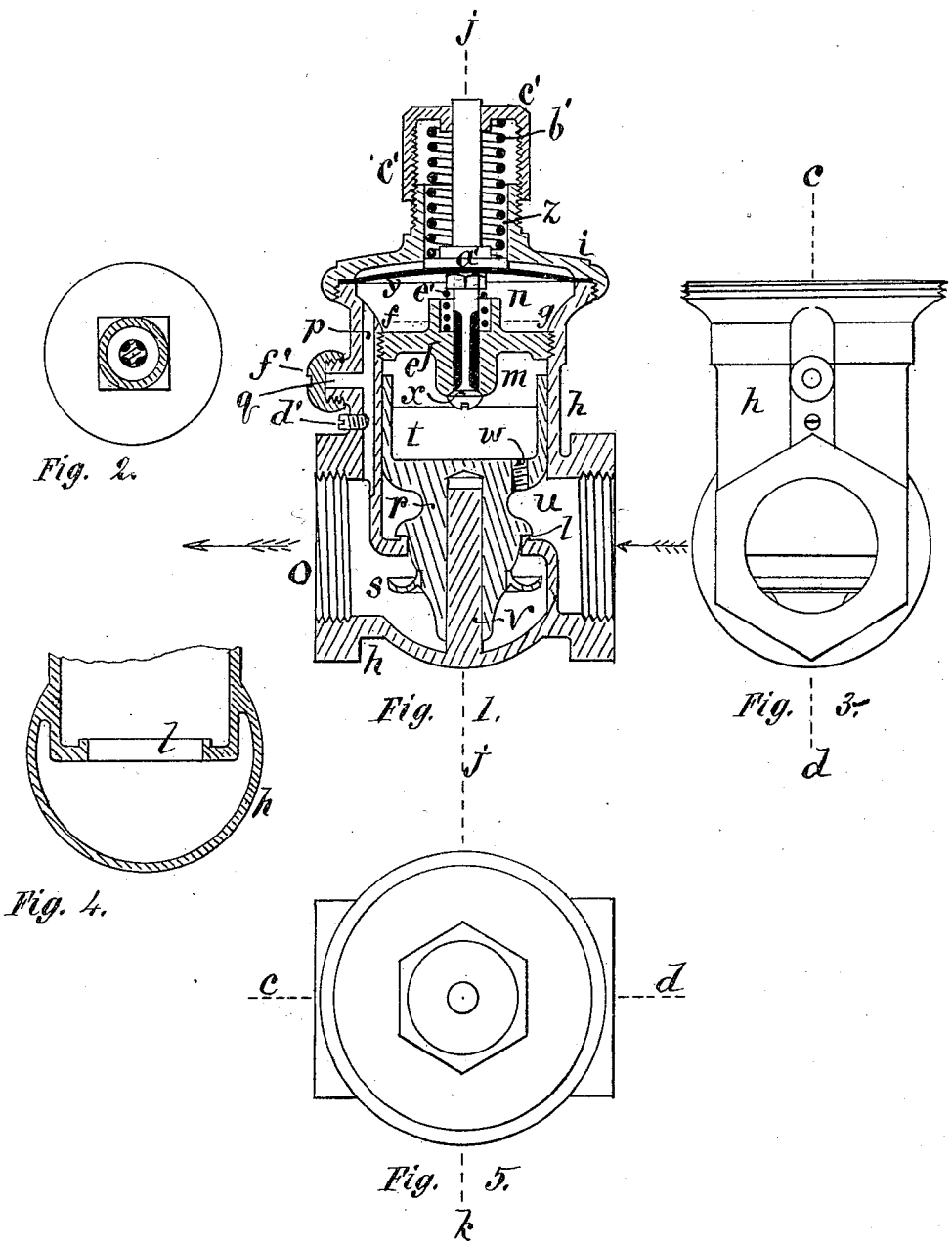
Witnesses.
J. N. B. Coffin
Dwight Chester
Inventor.
Nelson Curtis

UNITED STATES PATENT OFFICE.

NELSON CURTIS, OF NEWTON, MASSACHUSETTS.

PRESSURE-REGULATOR.

SPECIFICATION forming part of Letters Patent No. 246,088, dated August 23, 1881.

Application filed January 10, 1881. (No model.)

*To all whom it may concern:*

Be it known that I, NELSON CURTIS, of the city of Newton, in the county of Middlesex and State of Massachusetts, have invented certain new and useful improvements in pressure-regulators applicable to steam and other distributing and conveying pipes and reservoirs, of which the following is a specification.

The nature of my invention relates to the construction, arrangement, and combination of a secondary valve with and so as to control the operation of a main valve, substantially as hereinafter more fully set forth, with other members, passages, &c., as described.

With reference to the drawings, Figure 1 is a sectional elevation on lines $c\ d$; Fig. 2, a sectional plan of part $e$, the plane of section being at line $f\ g$. Fig. 3 is an elevation of part $h$, &c. Fig. 4 is a section through main valve-seat $l$ on line $j\ j\ k$. Fig. 5 is a plan.

Like letters refer to the same or corresponding parts in all the figures.

The part or shell $h$ has the chambers $n\ m$ and inlet and outlet nozzles or pipes, as indicated by the arrows, $o$ being the outlet. It is also provided with the valve $r$, and its seat $l$, forming the principal means of communication between the inlet and outlet pipes. Below or beyond the seat the valve $r$ is furnished with a collar or flange, $s$, in the passage-way from the valve-seat, and its opposite end is furnished with a piston, $t$, playing freely in the extension of chamber $m$. A small screw-tap, $w$, forms an easily graduated escape or passage from inlet or supply pipe at $u$ into chamber $m$. Piston $t$ has an excess of area over valve $r$.

An auxiliary or secondary valve of smaller dimensions—viz., $x$—forms the means of communication between chambers $m$ and $n$. This valve $x$ is seated and guided by part $e$, and will close by means of the pressure in chamber $m$, when permitted to do so, and may be assisted in closing promptly by spring $e'$, if desired.

A diaphragm, $y$, forming one bound or extremity of chamber $n$, is allowed to act on valve $x$ directly, or by means of an adjusting nut or screw on the stem of valve $x$, to push it open, except when the pressure in chamber $n$ rises to a given limit, then the diaphragm $y$ recedes from and allows valve $x$ to close, as described. The diaphragm $y$ is operated upon on the opposite side from chamber $n$ by means of a spring, $b'$, which is graduated to a given pressure by means of screw-cap $c'$. The spring $b'$ may act directly or through the intervention of a piston, $a'$. The diaphragm may be secured in place by means of screw-cap $i$ or other suitable means.

The chamber $n$ may be connected to pipe $o$ or any of its connections at any other point than that shown—as, for instance, at $q$ on pipe $p$.

The collar $s$ aids in the prompt closing of valve $r$, being placed in the passage-way from valve-seat $l$.

The operation is somewhat as follows: The fluid, &c., under pressure, entering the inlet to space $u$, acts on the excess of area of piston $t$ over that of valve $r$, so lifting valve $r$ from its seat $l$, the pressure passing thus to outlet-pipe $o$. The pressure in $o$ passes along pipe or passage $p$ into chamber $n$. When this pressure rises to the limit at which spring $b'$ has been adjusted it (the spring) yields, permitting the diaphragm $y$, actuated by that pressure, to recede from valve $x$, so permitting valve $x$ to close. Valve $x$ having closed, pressure immediately accumulates in chamber $m$, finding its way through the screw-tap $w$, as it has all the while preceding, but then escaping through valve $x$, now confined by the closing of valve $x$, acts on the excess of area of piston $t$ over valve $r$, so closing, in part or entirely, the valve $r$, and checking or limiting the further increase of pressure in pipe $o$ and the pipes and reservoirs to which pipe $o$ may be connected. When the pressure in $o$ falls below the limit for which spring $b'$ is adjusted it will be equalized in chamber $n$ by means of passage $p$, allowing diaphragm $y$ to be pushed back by spring $b'$. The diaphragm pushes open valve $x$, so relieving the pressure in chamber $m$, and so permitting valve $r$ to be lifted or opened by the pressure in space $u$, and inlet-pipe acting on the excess of area of piston $t$ over that of valve $r$, and so on indefinitely maintaining the pressure in pipe or pipes $o$ and their connections at the limited pressure for which spring $b'$ is graduated.

The leakage around piston $t$ may be used instead of the screw-tap $w$, but the latter is preferred, as thereby the amount of leakage or the capacity of the passage is made easily adjustable.

I claim—

1. In a pressure-regulator, the combination of the collar $s$, valve $r$, piston $t$, and case or shell $h$, substantially as and for the purpose set forth.

2. The collar or flange $s$, when applied to valve $r$ so as to intercept or receive impulse from the passing current, substantially as described.

NELSON CURTIS.

Witnesses:
   D. N. B. COFFIN,
   DWIGHT CHESTER.